United States Patent
Mevenkamp

[15] 3,704,690
[45] Dec. 5, 1972

[54] HIGH PRESSURE HEAT EXCHANGER FOR AMMONIA GAS SYNTHESIS PLANTS

[72] Inventor: Paul Mevenkamp, Lichtendorf, Germany

[73] Assignee: Friedrich Uhde GmbH, Dortmund, Germany

[22] Filed: Jan. 21, 1971

[21] Appl. No.: 108,512

[30] Foreign Application Priority Data

Feb. 19, 1970 Germany..................P 20 07 528.9

[52] U.S. Cl..................122/7 R, 23/289, 23/252 A, 122/32, 165/133, 165/134, 165/158
[51] Int. Cl..........................F28f 9/02, F22b 1/15
[58] Field of Search............165/158, 163, 134, 133; 122/32, 34, 7 R; 23/252 A, 281, 289, 199

[56] References Cited

UNITED STATES PATENTS

| 2,768,813 | 10/1956 | Boyer | 165/133 X |
| 2,388,177 | 10/1945 | Patterson et al. | 122/365 |
| 3,162,177 | 12/1964 | Loew et al. | 122/32 |
| 2,774,575 | 12/1956 | Walter | 165/158 X |

FOREIGN PATENTS OR APPLICATIONS

| 1,078,643 | 8/1967 | Great Britain | 122/32 |
| 1,016,251 | 1/1966 | Great Britain | 165/158 |

Primary Examiner—A. W. Davis, Jr.
Attorney—Malcolm W. Fraser

[57] ABSTRACT

A high pressure heat exchanger particularly useful for ammonia gas synthesis plants in which the hot recycle gas passes through an insulated guide tube and hood and then through a tubesheet having nitriding-resistant central heat exchanger tubes. The gas then reverses its flow to pass through peripheral tubes into the space between the shell and guide hood from which it passes from the exchanger. In the upper part, water is admitted into heat exchanger relation with the gas and the steam resulting passes from the exchanger. Cool outside air is delivered to the space between the guide hood and shell.

2 Claims, 1 Drawing Figure

PATENTED DEC 5 1972
3,704,690
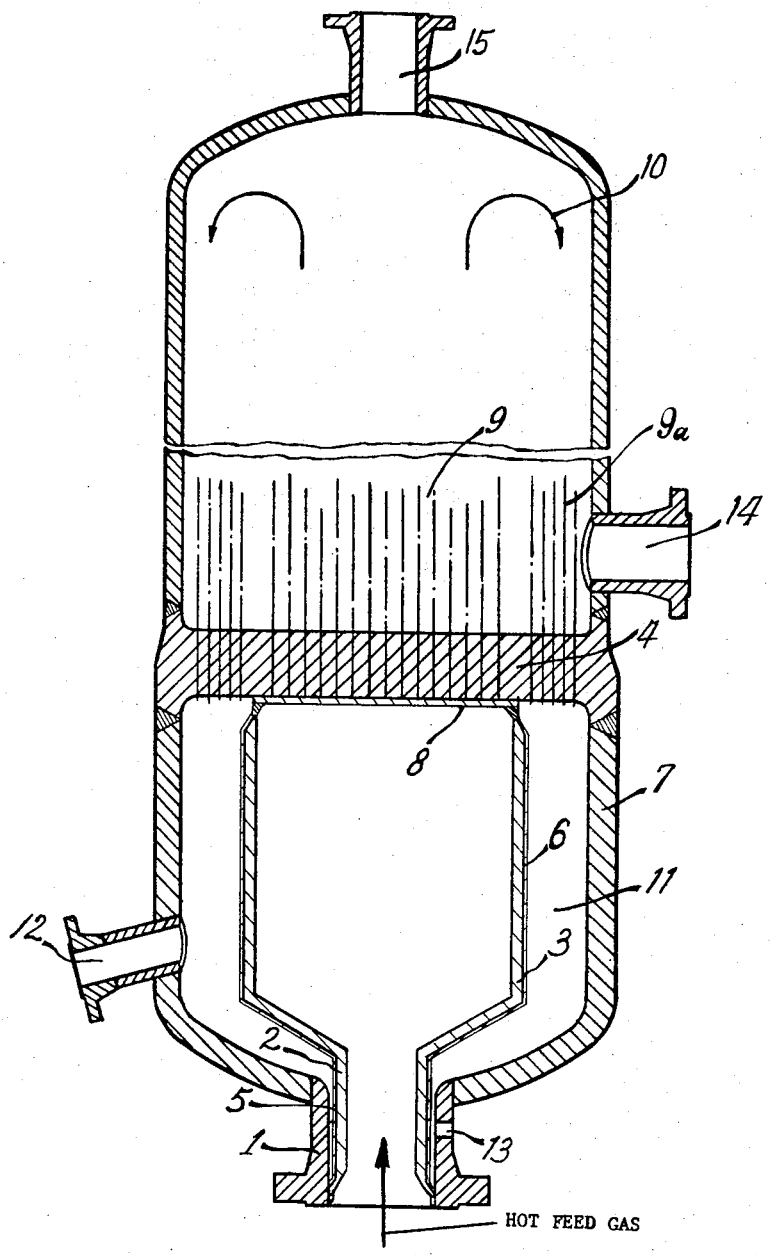
HOT FEED GAS
INVENTOR
PAUL MEVENKAMP
ATTORNEY

HIGH PRESSURE HEAT EXCHANGER FOR AMMONIA GAS SYNTHESIS PLANTS

BACKGROUND OF THE INVENTION

In an ammonia synthesis reactor, the gases containing nitrogen or nitrogen compounds are brought to a temperature of approximately 480° C. or more. Referring to conventional ammonia synthesis reactors, this gas is heat-exchanged against fresh synthesis feed gas. It leaves the ammonia synthesis reactor at temperatures ranging from 100° to 250° C. and is then utilized for steam production. At a temperature of approximately 250° C., the gas incorporates no risk for the material of construction of heat exchangers because no critical nitriding of the pressure-bearing shell need by expected at that temperature. In the ammonia synthesis reactor, the hot recycle gas which is at a temperature of approximately 480° C. or more cannot adversely affect the pressure-bearing shell of the reactor vessel because the pressure-bearing shell is cooled by the incoming cold recycle gas. Engineering work aimed at designing more-economical ammonia synthesis plants included a development that has made it possible to permit the hot process gas to leave the ammonia synthesis reactor at approximately 480° C., to employ the gas first for steam production and to utilize its residual heat content for preheating the fresh recycle gas. The change to this process route depends on making available a high-pressure heat exchanger in which the gases containing nitrogen or nitrogen compounds do not adversely affect the materials of construction.

At certain temperatures, gases containing nitrogen or nitrogen compounds cause an undesirable nitriding of the materials. Nitriding, in turn, entails an embrittlement and, consequently, a tendency to crack formation as soon as the structural element is subjected to stresses. Heat exchangers in ammonia synthesis plants arranged, for example, downstream of the ammonia synthesis reactor are exposed to a wide range of pressures and temperatures. At stand-still, they are exposed to the ambient temperature and an ambient pressure of 1 at. while working temperature and pressure are equal to or higher than 480° C. and 300 at., respectively. The risk of crack formation increases substantially when nitriding takes place under service conditions on the surface of the pressure-bearing structural elements, followed by high stresses that are attributable to a rise in pressure and temperature. The risk of crack formation can be lessened only by regular replacement of the endangered elements. Replacement means additional investment costs and production losses.

SUMMARY OF THE INVENTION

The present invention relates to a method and a device for routing the gas flow through high-pressure heat exchangers, particularly in ammonia synthesis plants where hot recycle gas is heat-exchanged against water. In designing heat exchangers for said purpose it is necessary to take into consideration the properties of the hot gas to be cooled; otherwise, the heat exchangers would be subject to premature deterioration.

The object of the invention is to provide a method for routing the gas flow and a design of the heat exchanger that will exclude the simultaneous influence of gas composition, pressure, and temperature.

Surprisingly, it was found that this problem can be solved by protecting the pressure-bearing shell parts of the heat exchanger against the hot gas which has a temperature of more than 300° C. The solution to the problem is accomplished by permitting the hot recycle gas that enters the heat exchanger channel to pass through a guide tube and a guide hood, to enter through the central part of the clad tubesheet into the adequately nitriding-resistant exchanger tubes, to pass through the tubes with a reversal of the direction of flow while transmitting part of its heat to the shell-side fluid, to enter through the peripheral tubes into the space between guide hood and channel shell, to counter-balance the internal pressure of the guide hood, and to leave the channel through a nozzle. It is expedient that the temperature of the gas leaving the heat exchanger tubes be lower than the nitriding temperature, preferably below 360° C. The channel is preferably composed of a central gas guide tube and a central gas guide hood, both guide elements being pressure-relieved and substantially nitriding-resistant, and a pressure-bearing shell.

The gas guide hood is attached to the tubesheet cladding by a gastight weld. Gas guide tube and gas guide hood are insulated to avoid any heat transfer to the cooled gas. A free space for the admission of cooling gas is provided between gas inlet nozzle and gas guide tube to prevent any excessive heat transfer to the pressure-bearing inlet nozzle.

BRIEF DESCRIPTION OF THE DRAWING

The FIGURE is a vertical sectional elevation partly diagrammatic of a heat exchanger for an ammonia synthesis plant.

DESCRIPTION OF THE PREFERRED EMBODIMENT

The hot recycle gas leaving the reactor enters into the high-pressure heat exchanger at a nozzle 1 and passes through a gas guide tube 2 and into a gas guide hood 3 that is attached to the center of a tubesheet 4 by a gastight weld. The gas guide tube 2 and the gas guide hood 3 are of substantially nitriding-resistant material and are provided with thermal insulation 5 and 6, respectively. This design prevents the heating of the pressure-bearing nozzle 1 and of the pressure-bearing channel shell 7 which contains the tube 2 and hood 3. To prevent an undesirable nitriding, a substantially nitriding-resistant cladding 8 is provided on the tubesheet 4 within the area occupied by the central gas guide hood. Any suitable material, such as steel alloys may be used as the nitriding-resistant material.

Inasmuch as the tubesheet surface is subject to moderate stresses only, crack formation owing to nitriding need not be expected. The tubesheet 4 contains adequately nitriding-resistant exchanger tubes 9 which are sealed against the cladding 8 by a gastight weld. The gas passes from gas guide hood 3 through tubes 9 and then reverses its flow, as indicated by arrows 10, to pass through peripheral tubes 9a, into a space 11 between the gas guide hood 3 and the shell 7. The reversal of gas flow takes place at the end of the heat exchanger and the temperature in the space 11 is lowered to a level below the nitriding temperature.

The high-pressure gas entering the heat exchanger is subject to a negligible pressure drop on its way through the exchanger tubes 9 so that the pressure load on the gas guide tube 2 and the gas guide hood 3 is also negligible. The cooled recycle gas leaves the high-pressure heat exchanger through nozzle 12.

To provide further protection of nozzle 1 against undesirable temperatures, despite the insulation of the gas guide tube 2, cold gas is injected through a port 13 into the space between the nozzle 1 and the gas guide tube 2. The cold gas surrounds the gas guide tube 2 for subsequent mixing with the gas which leaves the heat exchanger through the nozzle 12.

The water which is transformed into high-pressure steam in the heat exchanger is admitted to the water side through a lateral nozzle 14. The water routing for the natural circulation is designed to ensure that the water side of the tubesheet 4 is contacted with water of uniform temperature. The steam leaves the heat exchanger through nozzle 15.

The invention incorporates the particular advantage that the hot recycle gas of an ammonia synthesis plant can be utilized for the production of high-pressure steam. The gas flow is routed in such a way that the problems, viz. critical nitriding of the material of construction, high temperature, and high pressure do not add up but present themselves separately for individual solution. The gas guide tube 2 and the gas guide hood 3 are of substantially nitriding-resistant material, moderate nitriding is insignificant because these elements are not exposed to unilateral pressure. The pressure-bearing tubesheet 9 is clad on the gas-side to prevent nitriding. The pressure-bearing shell 7 of the channel in contacted by recycle gas whose temperature is below the critical nitriding temperature. The high-pressure heat exchanger can be fabricated using moderate quantities of high-grade, substantially nitriding-resistant material.

What I claim is:

1. A boiler heated by hot ammonia gas having as additional components $H_2$ and $N_2$ comprising
    a shell having a gas entrance adjacent one end,
    a tube sheet extending from an intermediate portion of said shell,
    a gas guide tube in said gas entrance,
    a gas hood within said shell spaced from the walls thereof,
    a nitride-resistant cladding on said tube sheet within the area occupied by said gas hood,
    a gas-tight connection between said gas hood and said cladding,
    nitride-resistant central tubes in said tube sheet for the passage of gas from said gas hood,
    peripheral tubes about said central tubes enabling gas to reverse its direction of flow and pass to the space between said hood and shell,
    a gas outlet from said space,
    means to introduce water in the region of said peripheral tubes, and
    means for removing steam from the region above said tube sheet.

2. A boiler as claimed in claim 1, comprising means for introducing relatively cold gas into the space between said guide hood and shell.

* * * * *